United States Patent [19]
Bartley

[11] Patent Number: 5,823,802
[45] Date of Patent: Oct. 20, 1998

[54] ELECTRICAL CONNECTOR WITH COMBINATION SEAL AND CONTACT MEMBER

[75] Inventor: Robert Michael Bartley, Ravenna, Ohio

[73] Assignee: General Motors Corporation, Detroit, Mich.

[21] Appl. No.: 902,765

[22] Filed: Jul. 30, 1997

[51] Int. Cl.⁶ .................................................. H01R 13/44
[52] U.S. Cl. ............................... 439/86; 439/913; 73/115
[58] Field of Search ..................................... 439/587, 125, 439/86, 913; 73/115; 324/393, 399, 400

[56] References Cited

U.S. PATENT DOCUMENTS

| | | | |
|---|---|---|---|
| 4,602,506 | 7/1986 | Sawamoto et al. | 73/115 |
| 4,969,352 | 11/1990 | Sellnau | 73/115 |
| 5,329,809 | 7/1994 | Sellnau et al. | 73/115 |
| 5,363,046 | 11/1994 | Shimasakiet al. | 324/393 |
| 5,487,676 | 1/1996 | Maruyama et al. | 324/399 |

*Primary Examiner*—Neil Abrams
*Assistant Examiner*—T. C. Patel
*Attorney, Agent, or Firm*—Cary W. Brooks

[57] ABSTRACT

An electrical connector is plugged onto an electrical device that has a hollow sleeve and an annular bonnet that has an outer electrical contact ring. The electrical connector includes an annular insulator, a lower elastomeric seal ring, a combination seal and contact member, a shielded conductor to carry an electrical signal out of the electrical connector and a flanged metal guard ring. The combination seal and contact member has a non-conductive elastomeric annulus and a conductive elastomeric portion that are co-molded to provide a unitary annular part. The annulus has a flanged upper end that is bonded to the flanged guard ring and a thinner lower end that has a plurality of axially spaced circumferential flexible sealing lips that biasingly engage the bonnet above the outer electrical contact ring. The conductive elastomeric portion is made of a non-conductive elastomeric material that has conductive particles widely dispersed throughout the material so that the conductive elastomeric portion exhibits a high electrical resistance in the uncompressed state that diminishes when the elastomeric portion is compressed by the outer electrical contact ring of the bonnet so that the conductive elastomeric portion acts as an electrical conductor that connects the contact ring and the conductor electrically. The lower elastomeric seal ring has a plurality of axially spaced flexible circumferential sealing lips that biasingly engage the bonnet so that the electrical connector sealingly engages the bonnet below as well as above the contact ring and the conductive elastomeric portion of the combination seal and contact member.

13 Claims, 5 Drawing Sheets

ELECTRICAL CONNECTOR WITH COMBINATION SEAL AND CONTACT MEMBER

TECHNICAL FIELD

This invention relates generally to electrical connectors and more particularly to sealed electrical connectors for electrical devices that have an annular contact ring.

BACKGROUND OF THE INVENTION

U.S. Pat. No. 5,329,809 granted to Mark C. Sellanu, Robert G. Plyler and Andrew F. Rodondi Jul. 19, 1994, discloses a non intrusive cylinder pressure sensor that includes an electrically shielded sensing element that is disposed in an exterior channel of a hollow metal sleeve. The sensing element has an upper surface electrical contact that communicates via an annular shaped bonnet that has an electrical contact at the bottom of a finger that engages the sensing element contact and a metal trace that leads to an annular ring contact on an exposed upper outer surface of the bonnet. The annular contact ring of the bonnet must be sealed environmentally and electrically connected to a remote electronic signal and/or control device without blocking the passage of the hollow metal sleeve that provides access to a spark plug that is surrounded by the pressure sensor.

SUMMARY OF THE INVENTION

The object of this invention is to provide an electrical connector that is particularly useful for devices such as the cylinder pressure sensor described above that are characterized by a hollow sleeve and an annular contact ring that must be sealed and electrically connected to a remote electronic signal and/or control device without blocking passage through the hollow sleeve.

A feature of the invention is that the electrical connector is characterized by a combination seal and contact member that simplifies and reduces the cost of the electrical connector.

Another feature of the invention is that the electrical connector is characterized by a multi-layered flexible printed circuit that carries a shielded electrical signal to a remote location.

Still another feature of the invention is that the electrical connector is characterized by a metal insert that shields the electrical signal as well as protects damagable components of the electrical connector.

These and other objects, features and advantages of the invention will become more apparent from the following description of a preferred embodiment taken in conjunction with the accompanying drawing.

DESCRIPTION OF THE PREFERRED EMBODIMENT

Figure 1:
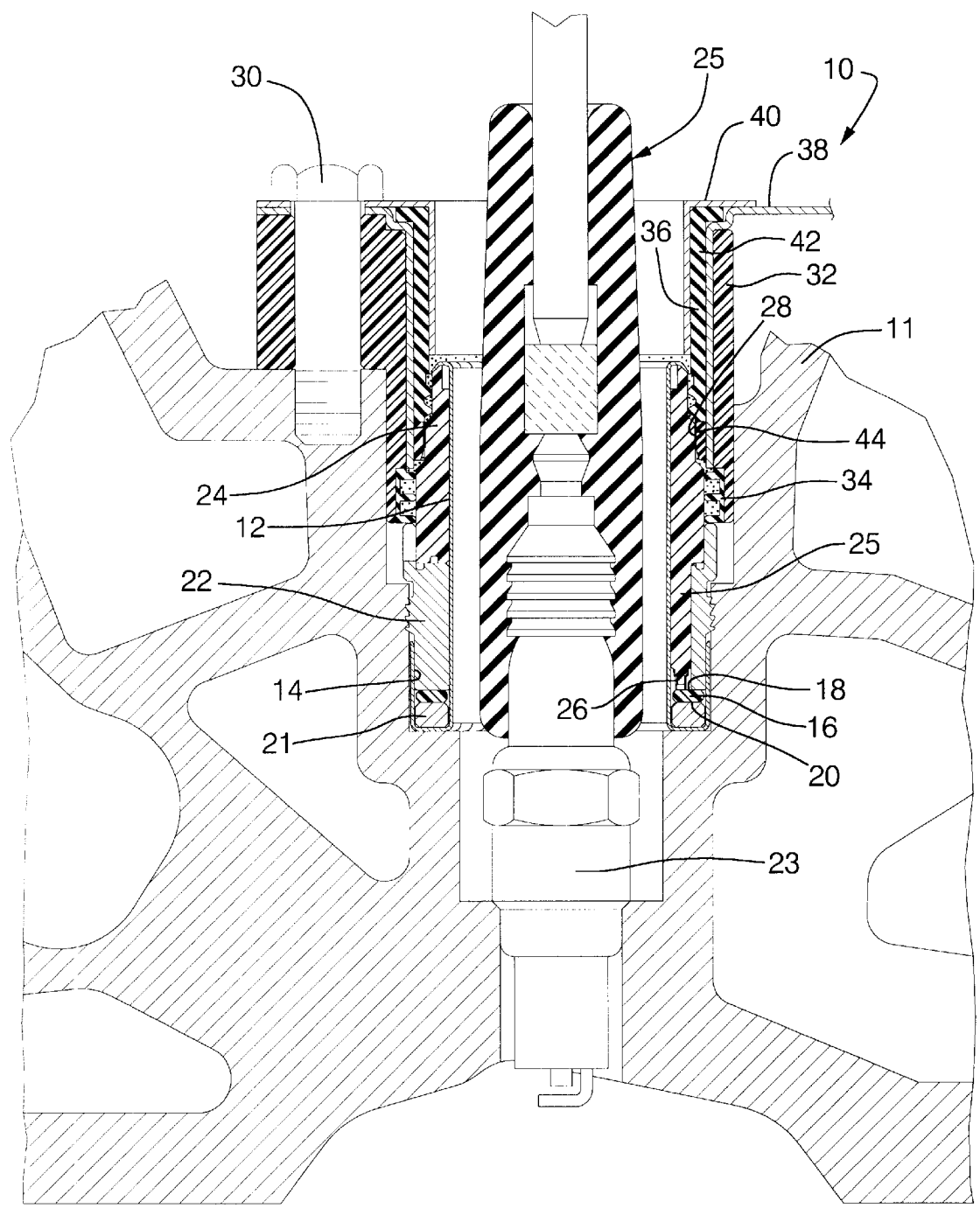
FIG. 1 is a sectional view of a cylinder pressure sensor equipped with an electrical connector in accordance with the invention installed in an engine.

Referring now to the drawing, FIG. 1 shows a cylinder pressure sensor 10 installed in an internal combustion engine 11. Cylinder pressure sensor 10 comprises a deep drawn aluminum sleeve 12 that has a deep annular external channel 14 at the lower end for housing a sensing element 16 that has electrical contacts 18 and 20 on its upper and lower surfaces respectively. A washer 21 of a hard aluminum alloy such as aluminum 6061 T-6 rests in the bottom of channel 14 below sensing element 16. Washer 21 serves as an electrical conductor connecting the lower electrical contact 20 and the sleeve 12 electrically. Sleeve 12 is grounded to the head of internal combustion engine (not shown) electrically when the pressure sensor 10 is installed as shown in FIG. 1.

Pressure sensor 10 further comprises an annular mounting shell 22 that has a lower end that fits into channel 14 and engages the upper surface of sensing element 16. Mounting shell 22 is customarily made of a hard, weldable aluminum alloy with the lower end press fit into the channel 14 at the outer diameter and welded in place. Shell 22 has external threads for installing the pressure sensor 10 in the head of the internal combustion engine 11. Pressure sensor 10 is typically screwed into a deep spark plug well in an engine head in a surrounding relationship to a spark plug 23 or the like. Access for a spark plug connector 25 attached to the end of a spark plug wire is provided through the passage of the hollow metal sleeve 12.

Pressure sensor 10 further includes an annular bonnet 24 that is customarily injected molded from resins that are compatible with metal traces that form conductive paths and contacts as explained below. Bonnet 24 surrounds the upper portion of shell 12 and sits atop mounting shell 22. Bonnet 24 is retained against an internal shoulder of mounting shell 22 by an upper lip of shell 12 that is rolled outwardly over the upper end of bonnet 24.

Bonnet 24 has a finger 25 that is disposed in an internal slot in the annular mounting shell 22 and that terminates in a nipple at the lower end. A short metal tube 26 pressed onto the nipple contacts the electrical contact 18 on an upper surface of sensing element 16. Bonnet 24 has a metal trace that commences on the nipple, continues up along an inner surface of finger 25 in a manner that insulates the trace from shell 12 and terminates as an outer electrical contact ring 28. The trace is not shown and the outer contact ring 28 is shown as a heavy black line in the interest of clarity. However, metal traces and their manner of construction are well known to those skilled in the art and hence need not be illustrated in detail.

This invention is concerned with sealing electrical contacts such as contact ring 28 and electrically connecting such a contact to an external electrical device such as an electronic signaling and/or controlling device at a remote location without blocking passage through sleeve 12.

Figure 2:
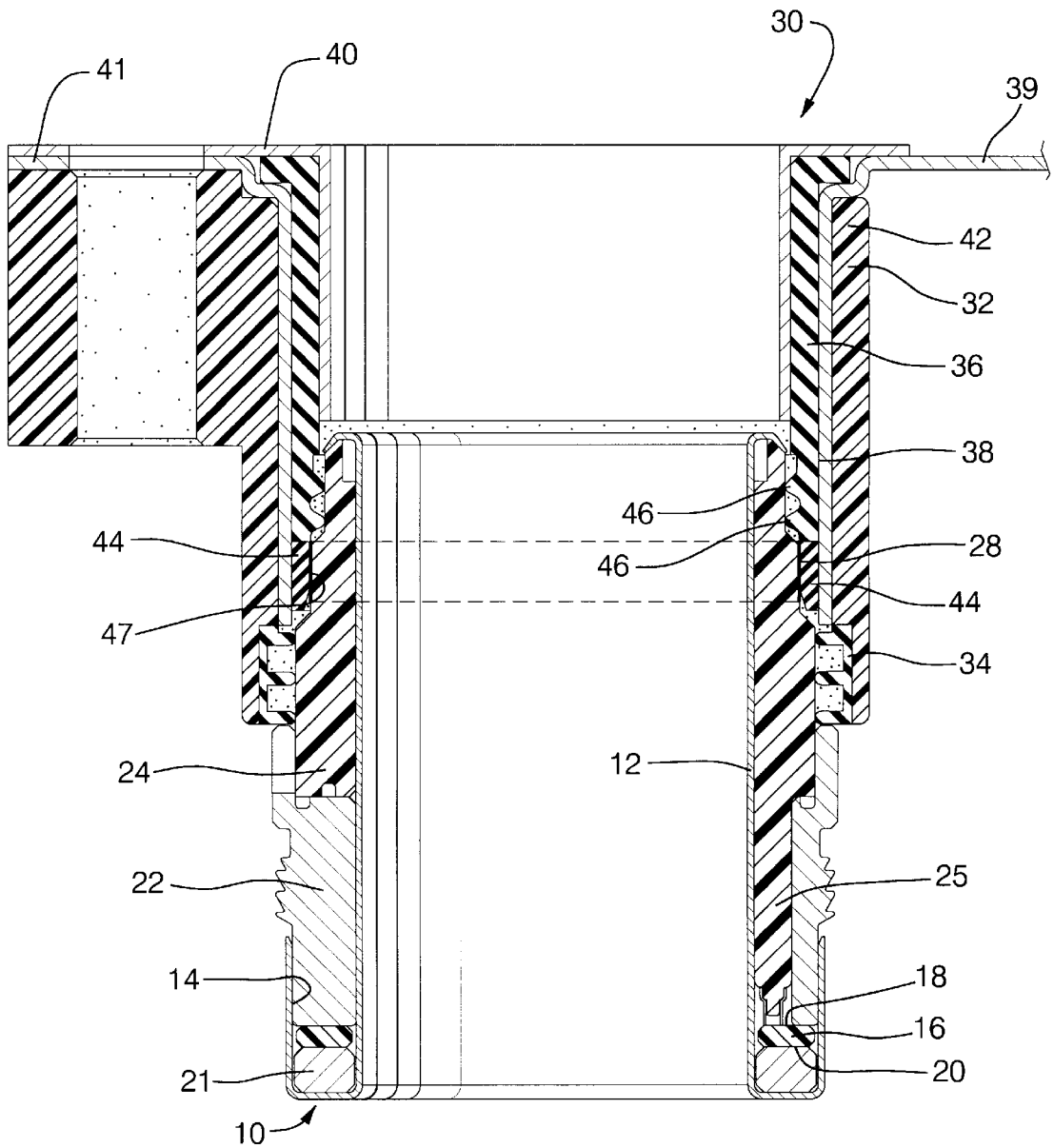
FIG. 2 is an enlargement of the cylinder pressure sensor shown in FIG. 1.
Figure 3:
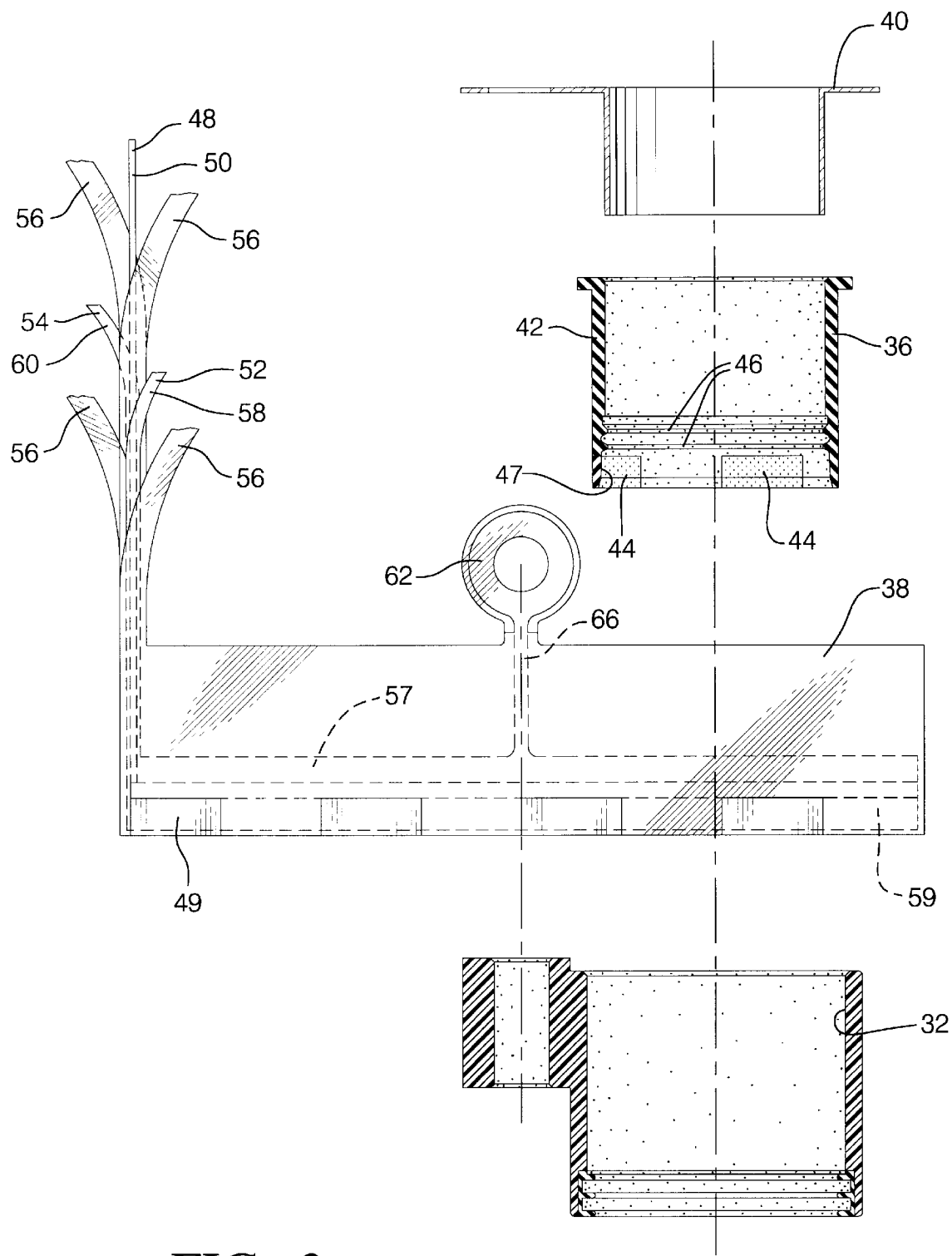
FIG. 3 is an exploded sectional view of the electrical connector shown in FIG. 1.

Referring now to FIGS. 1, 2 and 3 and by way of example, the invention may be incorporated in a sealed electrical connector 30 that fits onto the exposed upper portion of bonnet 24 which in this particular instance has an exposed outer surface shaped in three diminishing steps. Connector 30 comprises an annular insulator 32, a lower seal ring 34, a combination seal and contact member 36, a multi-layered flexible printed circuit 38 to carry an electrical signal out of connector 30 and a flanged metal guard ring 40 that is preferably made of stainless steel.

Combination seal and contact member 36 comprises a non-conductive elastomeric annulus 42 and a conductive elastomeric portion 44 that are co-molded to provide a unitary annular part. Annulus 42 has an upper end that is preferably bonded to the flanged guard ring 40 and a thinner lower end. The thinner lower end has a plurality of axially spaced flexible circumferential sealing lips 46 that project radially inwardly from its internal surface. Lips 46 biasingly engage the small stepped end of bonnet 24. Annulus 42 is molded of a flexible, non-conductive elastomeric material having good sealing qualities such as a silicone rubber having a Shore A durometer hardness of about 18.

Figure 4A:
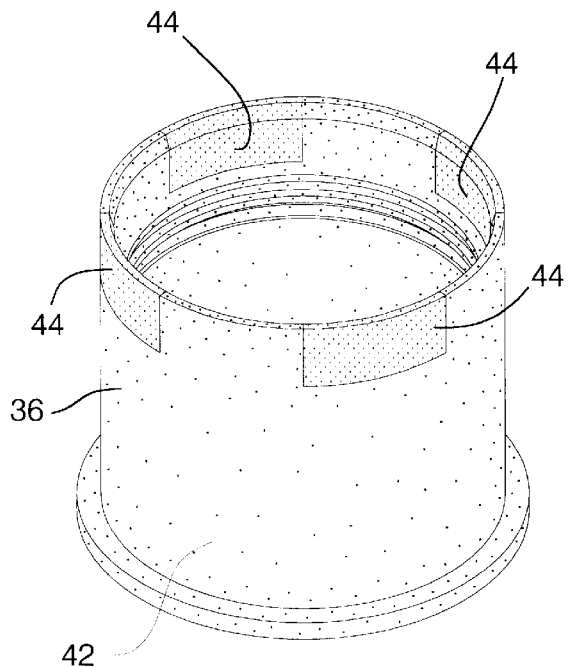
FIGS. 4A, 4B, 4C and 4D are enlarged perspective views showing alternative constructions for a component of the electrical connector of FIG. 1.

Conductive elastomeric portion 44 comprises a plurality of circumferentially spaced arcuate segments that are located at the end of annulus 42 as shown in FIG. 4A. Conductive elastomeric portion 42 is preferably shaped and attached in a co-molding operation where the nonconductive elastomeric annulus 42 and the conductive elastomeric portion 44 are molded simultaneously in a mold cavity.

Conductive elastomeric portion 44 is molded of a flexible, non-conductive elastomeric material such as silicone rubber that has conductive particles, such as carbon or silver particles, dispersed throughout the material before portion 44 is molded. Portion 44 is stiffer than annulus 42 but still flexible with the conductive silicone rubber having a Shore A durometer hardness in the range of 50–60. Preferably, the conductive particles are widely dispersed so that the molded conductive elastomeric portion 44 exhibits a very high electrical resistance and electrically insulative quality in the uncompressed state that diminishes as the elastomeric portion is compressed. Moreover the conductive elastomeric portion 44 is preferably shaped with an inner contact surface 47 that has a minimum inner diameter that is less than the outer diameter of the outer electrical contact ring 28 of bonnet 24.

Figure 5:
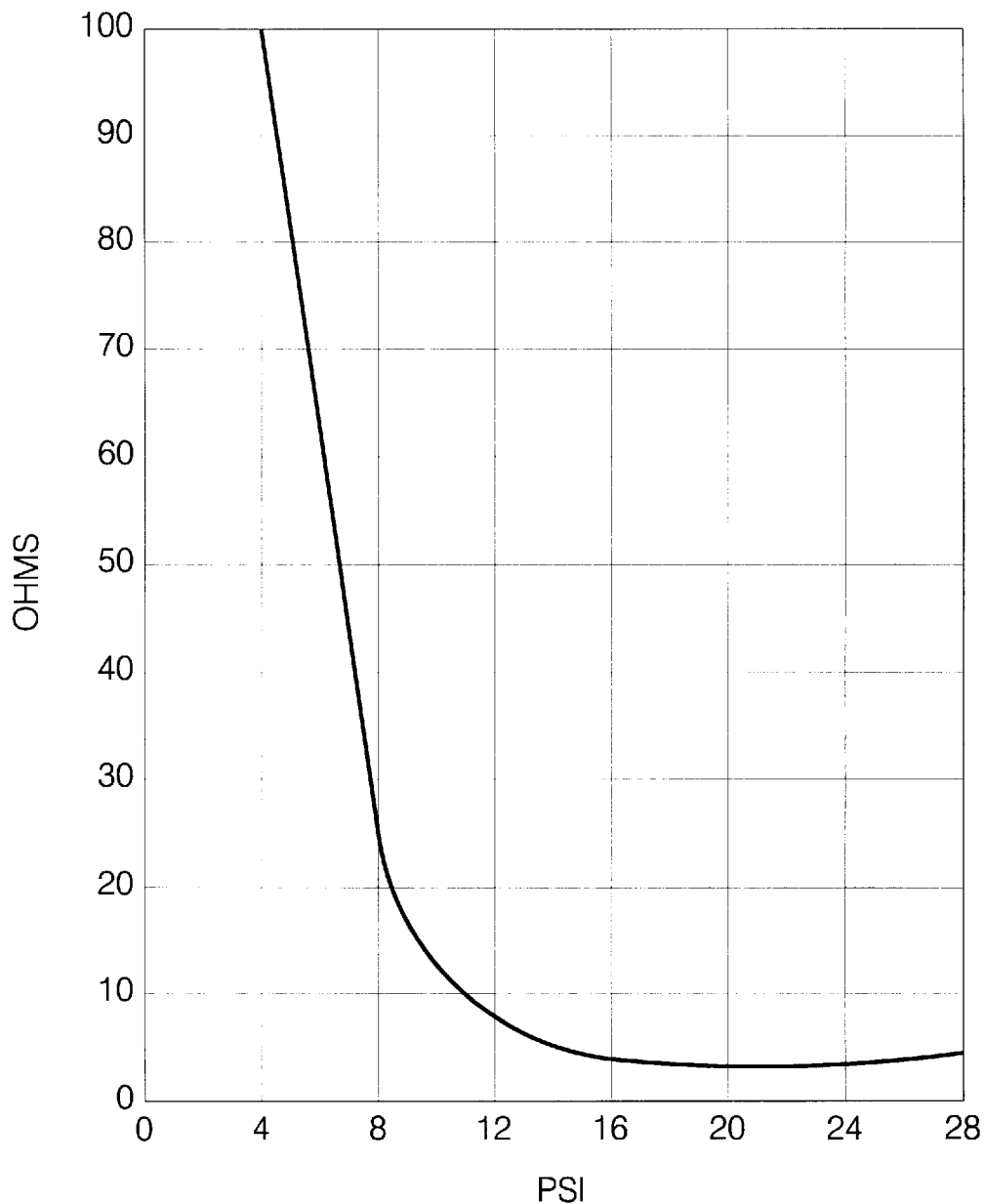
FIG. 5 is a graph showing electrical characteristics of a conductive elastomeric portion of the components shown in FIG. 4A.

FIG. 5 is a graph of a typical conductive silicone rubber that may be used for portion 44 showing the electrical resistance of the material as a function of the pressure applied to the material. As shown by the graph of FIG. 5, the electrical resistance is very high at low pressure but diminishes to a low and relatively constant value for a particular pressure range. In the example of FIG. 5, the electrical resistance is about 300 ohms at a pressure of 4 pounds per square inch (psi) and diminishes to about 5 ohms for pressures in the range of about 16 to 28 psi.

In the free or uncompressed state, conductive elastomeric portion 44 has a high electrical resistance so that portion 44 is practically an insulator. However, when connector 30 is plugged onto bonnet 24, the conductive elastomeric portion 44 is biased radially outwardly and compressed by engagement with ring contact 28 so that the electrical resistance is reduced to a relatively low value as demonstrated by the graph of FIG. 5. Portion 44 is then very conductive and connects ring contact 28 to the multi-layered flexible printed circuit 38 electrically. Flexible printed circuit 38 then carries the electric current flowing through sensor 16 out of electrical connector 30.

As best shown in FIG. 3, flexible printed circuit 38 comprises seven (7) layers for transmitting the small electric current flowing through sensor 16 and shielding this small electric current against electromagnetic interference. The heart of the flexible printed circuit is a gold plated conductor 48 that comprises a contact band 49 and a lead 50 that is attached to the end of the contact band. Four spaced portions of the contact band 49 are exposed on one surface as shown in FIG. 3. These exposed portions are on the inner surface of the flexible printed circuit 38 when it is rolled into a cylinder and sandwiched between insulator 32 and combination member 36 is shown in FIGS. 1 and 2 so that the exposed portions of band 49 contact conductive elastomeric portions 44.

Referring now to FIG. 3, conductor 48 is shielded by inner and outer copper layers 52 and 54, each of which is sandwiched between two layers of insulative film 56. Inner copper layer 52 comprises a narrow band 57 above the exposed portions of contact band 49 and a lead 58 that is connected to an end of band 57. Outer copper layer 54 comprises a wider band 59 that overlaps the exposed portions of contact band 49 in an insulated manner and a lead 60 that is connected to an end of band 59. Outer copper layer 54 also has a ground lead 61 that includes a ring contact 62 that has an exposed inner surface.

As shown in FIGS. 1 and 2, the flexible printed circuit 38 is rolled into a cylinder and disposed between insulator 32 and combined member 36. When so disposed, it has a lead portion 39 leading out of connector 30 comprising lead portions 48, 58 and 60 separated and insulated by four interdigitated layers of film.

Lead portion 48 is connected to a remote control and/or signal device (not shown) and lead portions 58 and 60 are connected to ground (not shown). Ground lead 61 is sandwiched between a flange of guard ring 40 and a boss of insulator 32 with the exposed surface of ring contact 62 engaging the flange of the metal guard ring 40 so that the ground lead 61 is grounded on the internal combustion engine 11 when electrical connector 30 is bolted to the engine as shown in FIG. 1.

The several individual layers of the flexible printed circuit 38 are not shown in FIGS. 1 and 2 for the sake of clarity. However, the details of the flexible printed circuit 38 are clearly illustrated in FIG. 3 and easily understood from this figure.

Electrical connector 30 also includes a lower elastomeric seal ring 34 that has a plurality of axially spaced flexible circumferential sealing lips that biasingly engage the large stepped portion of bonnet 24. Thus electrical connector 30 sealing engages bonnet 24 below as well as above contact ring 28 and conductive elastomeric portion 44 which acts as an electrical contact in the combination seal and contact member 36.

When electrical connector 30 is plugged onto pressure sensor 10 as shown in FIGS. 1 and 2, the passage through shell 12 is not blocked and the flanged guard ring 40 protects combination seal and contact member 36 against damage when the spark plug 23 is installed or removed or the spark plug connector 25 is attached or detached via the passage of the shell 12 of pressure sensor 10. In this regard it should be noted the flanged guard ring 40 is signed so that overhangs the contact ring 28 and the outer portion of rolled over flange of shell 12.

Figure 4B:
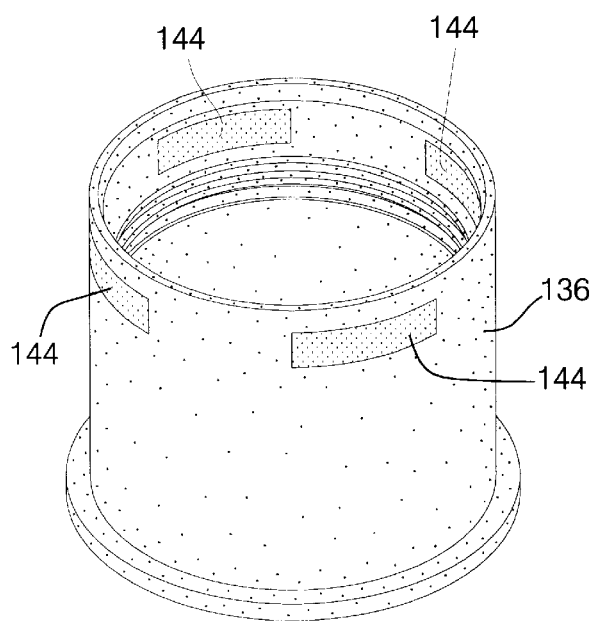
Figure 4C:
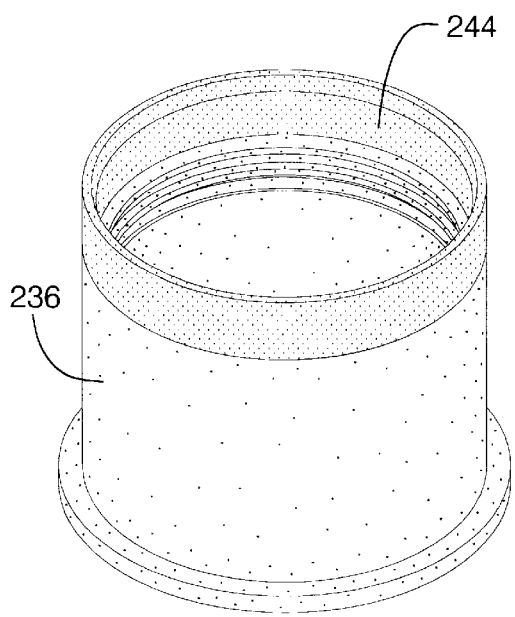
Figure 4D:
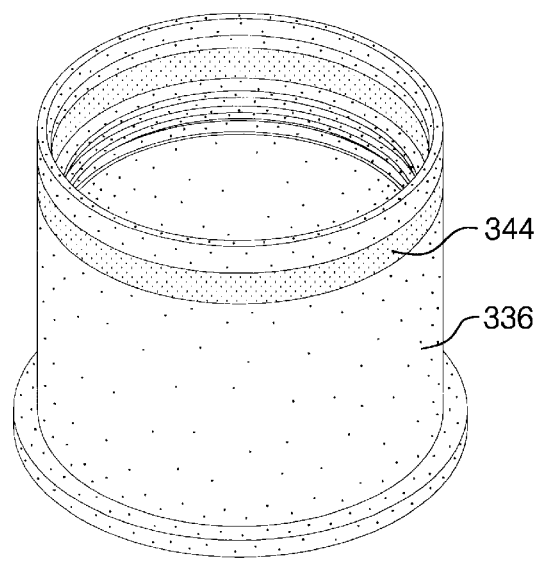

The contact portion of the combination seal and contact member 36 is shown as a plurality of molded conductive elastomeric segments 44 at the end of combination member 36 in FIGS. 1, 2, 3 and 4A. However, the contact portion can take other shapes and forms. For instance, the contact portion can take the form of a plurality of molded conductive elastomeric segments 144 that are spaced from the end the alternative combination seal and contact member 136 as shown in FIG. 4B. The contact portion can also take the form of a single molded conductive elastomeric rings 244 at the end of the combination member 236 as shown in FIG. 4C or a single molded conductive elastomeric ring 344 that is spaced from the end of the contact member 336 as shown in FIG. 4D. Moreover, the combination seal and contact member itself can take other forms and shapes depending in part on the electrical connector and the device to which the electrical connector is attached.

Obviously, many modifications and variations of the present invention in light of the above teachings may be made. It is, therefore, to be understood that, within the scope of the appended claims, the invention may be practiced otherwise than as specifically described.

It is claimed:

1. An electrical connector for an electrical device having a hollow sleeve and an annular bonnet that has an outer electrical contact ring comprising:

an annular insulator, a lower elastomeric seal ring, a combination seal and contact member, a conductor to carry an electrical signal out of the electrical connector and a flanged metal guard ring, the combination seal and contact member having a non-conductive elastomeric annulus and a conductive elastomeric portion that are co-molded to provide a unitary annular part, the annulus having a flanged upper end that is bonded to the flanged metal guard ring and a thinner lower end, the lower end having a plurality of axially spaced circumferential flexible sealing lips that project radially inwardly for biasingly engaging the bonnet above the outer electrical contact ring, the conductive elastomeric portion being attached to the lower end in a co-molding operation where the non-conductive elastomeric annulus and the conductive elastomeric portion are molded simultaneously in a mold cavity, the conductive elastomeric portion comprising a non-conductive elastomeric material that has conductive particles widely dispersed throughout the material before the conductive elastomeric portion is molded so that the molded conductive elastomeric portion exhibits a high electrical resistance in the uncompressed state that diminishes as the elastomeric portion is compressed, the conductive elastomeric portion being shaped with an inner contact surface that has a minimum inner diameter that is less than the outer diameter of the outer electrical contact ring of bonnet so that the conductive elastomeric portion is biased radially outwardly and compressed by engagement with the ring contact so that the electrical resistance is reduced to a relatively low value and acts as an electrical conductor that connects the ring contact and the metal insert electrically, and the lower elastomeric seal ring having a plurality of axially spaced flexible circumferential sealing lips that biasingly engage the bonnet so that the electrical connector sealingly engages the bonnet below as well as above the contact ring and the conductive elastomeric portion that acts as an electrical contact in the combination seal and contact member.

2. An electrical connector for an electrical device having a hollow sleeve and an outer electrical contact ring that is located outwardly of the sleeve comprising:

an annular insulator, a combination seal and contact member disposed in the annular insulator, and a conductor disposed between the annular insulator and the combination seal and contact member to carry an electrical signal out of the electrical connector, the combination seal and contact member having a non-conductive elastomeric annulus and a conductive elastomeric portion, the annulus having an upper end and a thinner lower end that has a plurality of axially spaced circumferential flexible sealing lips that project radially inwardly for biasingly engaging the electrical device above the contact ring, the conductive elastomeric portion comprising a non-conductive elastomeric material that has conductive particles widely dispersed throughout the material so that the conductive elastomeric portion exhibits a high electrical resistance in the uncompressed state that diminishes as the elastomeric portion is compressed, and the conductive elastomeric portion being shaped so that the conductive elastomeric portion is biased radially outwardly and compressed by engagement with ring contact so that the electrical resistance is reduced to a relatively low value and acts as an electrical conductor that connects the ring contact and the metal insert electrically when the electrical connector is installed on the electrical device.

3. The electrical connector as defined in claim 2 wherein the non-conductive elastomeric annulus and the conductive elastomeric portion are co-molded to provide a unitary combination seal and contact member and the conductive elastomeric portion is attached to the cylinder preferably in the co-molding operation where the non-conductive elastomeric annulus and the conductive elastomeric portion are molded simultaneously in a mold cavity.

4. The electrical connector as defined in claim 3 wherein the conductive elastomeric portion is ring shaped.

5. The electrical connector as defined in claim 3 wherein the conductive elastomeric portion comprises a plurality of circumferentially spaced arcuate segments.

6. An electrical connector for an electrical device having an annular bonnet that has an outer electrical contact ring comprising:

an annular insulator, a combination seal and contact member, and a conductor to carry an electrical signal out of the electrical connector, the combination seal and contact member having a non-conductive elastomeric annulus and a conductive elastomeric portion for connecting the contact ring to the conductor electrically, the annulus having a lower end that has a plurality of axially spaced circumferential flexible sealing lips that project radially inwardly for biasingly engaging the bonnet, the conductive elastomeric portion comprising a non-conductive elastomeric material that has conductive particles dispersed throughout the material so that the molded conductive elastomeric portion exhibits an electrical resistance in the uncompressed state that diminishes when the conductive elastomeric portion is compressed, and the conductive elastomeric portion is shaped with an inner contact surface that has a minimum inner diameter that is less than the outer diameter of the outer electrical contact ring of bonnet so that the conductive elastomeric portion is biased radially outwardly and compressed by engagement with ring contact so that the electrical resistance is reduced when the electrical connector is plugged onto the bonnet.

7. The electrical connector as defined in claim 6 wherein the conductive elastomeric portion is ring shaped.

8. The electrical connector as defined in claim 6 wherein the conductive elastomeric portion comprises a plurality of circumferentially spaced arcuate segments.

9. The electrical connector as defined in claim 6 wherein the conductive elastomeric portion is at the end of the cylinder of the non-conductive elastomeric annulus.

10. The electrical connector as defined in claim 6 wherein the combination seal and contact member has a flanged end that bonded to a flanged metal guard ring.

11. The electrical connector as defined in claim 6 further including a metal guard ring that is signed to overhang damageable portions of an electrical device having an annular bonnet that has an outer electrical contact ring.

12. The electrical connector as defined in claim 6 wherein the conductor is a part of a flexible printed circuit that includes inner and outer conductive layers for shielding the conductor.

13. The electrical connector as defined in claim 12 further including a flanged metal guard ring and outer conductive layers for shielding the conductor is grounded on the guard ring.

* * * * *